No. 12,257. REISSUED AUG. 9, 1904.

W. M. DAVIS.

TOILET PAPER.

APPLICATION FILED JUNE 11, 1903.

2 SHEETS—SHEET 1.

Witnesses;

F. G. Tilton,

Wm. H. Wrchase

Inventor,

Wilbur M. Davis;

A. B. Upham,

His Attorney.

No. 12,257. REISSUED AUG. 9, 1904.

W. M. DAVIS.

TOILET PAPER.

APPLICATION FILED JUNE 11, 1903.

2 SHEETS—SHEET 2.

Witnesses;

H. G. Tilton,

Wendell W. Chase

Inventor,

Wilbur M. Davis;

A. B. Upham,

His Attorney.

NORRIS PETERS INC. LTHO., WASHINGTON, D. C.

No. 12,257. Reissued August 9, 1904.

UNITED STATES PATENT OFFICE.

WILBUR M. DAVIS, OF WINTHROP, MASSACHUSETTS, ASSIGNOR TO CHARLES H. STEBBINS, OF EVERETT, MASSACHUSETTS.

TOILET-PAPER.

SPECIFICATION forming part of Reissued Letters Patent No. 12,257, dated August 9, 1904.

Original No. 714,652, dated November 25, 1902. Application for reissue filed June 11, 1903. Serial No. 161,076.

*To all whom it may concern:*

Be it known that I, WILBUR M. DAVIS, a citizen of the United States, and a resident of Winthrop, in the county of Suffolk, State of Massachusetts, have invented certain new and useful Improvements in Toilet-Paper, of which the following is a full, clear, and exact description.

This invention is in the line of toilet-paper in which the same is wound in a continuous roll partially severed at intervals; and its object is the easy grasping of the end of the paper which it is desired to tear free from the remainder of the roll.

The other features of my invention are as hereinafter set forth.

Figure 1:
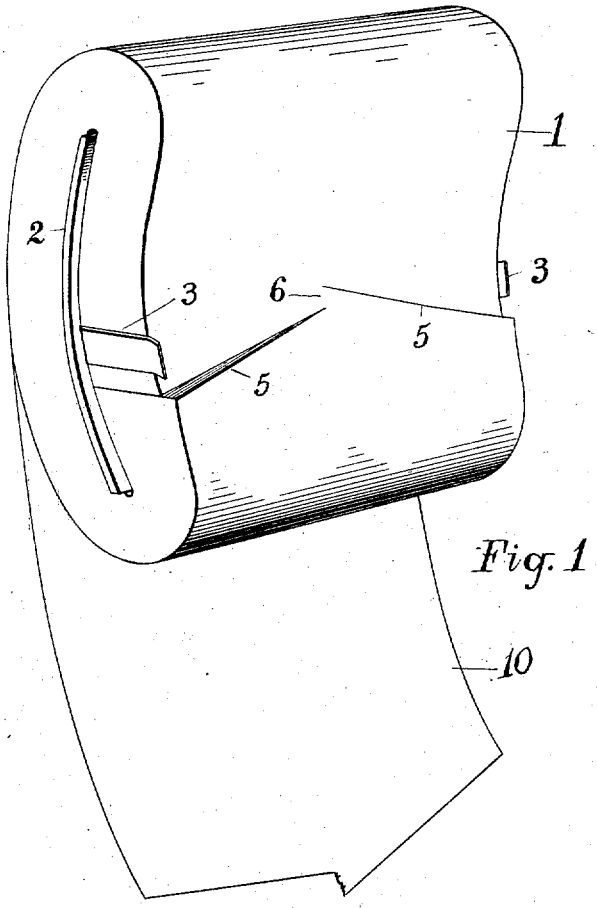
Figure 2:
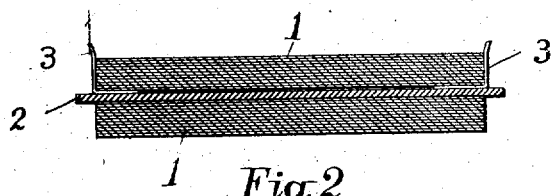
Figure 3:
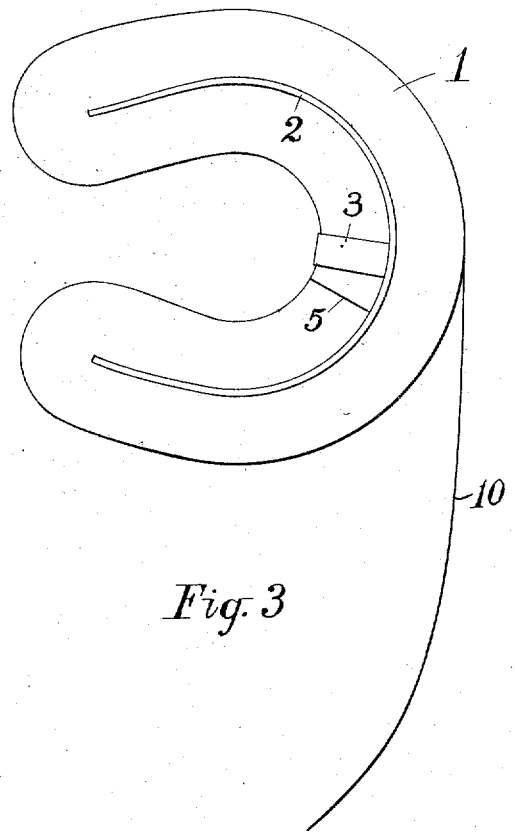

Referring to the drawings forming part of this specification, Figure 1 is a perspective view of a roll of toilet-paper made in accordance with my invention. Fig. 2 is a transverse sectional view of the same, and Fig. 3 is a side view of a deeply-curved form of my invention.

The toilet-paper may be wound upon a cylindrical roller in the usual manner or upon a flat board; but whichever way is adopted the roll can with equal readiness be given the flattened and also the concavo-convex shape shown in Fig. 1. A sheet of pasteboard 2 is introduced within the roll to constitute a supporting-core, the width of the pasteboard being sufficient to hold said roll 1 in its flattened condition and its length being proportioned to cause its ends to project from an eighth to a quarter of an inch beyond the sides of the roll. Strips of cloth, paper, or other material 3 are then gummed or pasted to the sides of the roll in front of said pasteboard core 2 and also to said core, as shown in Figs. 1 and 2. Then with a knife or knives suitably gaged the cuts 5 are made through the front of the roll to said core. These cuts are preferably two in number and are made at an oblique angle with the sides of the roll, their inner ends terminating at the center line of the roll, measuring between its sides, but at a distance apart of approximately a quarter of an inch in the direction of the roll's height. This leaves an unsevered portion or neck 6, which can be easily torn through in said direction, owing to the fact that the fibers of the paper run in such direction and can be much more readily torn apart than broken across.

One of the great difficulties always found in connection with the feeding of sheets of paper from a pile thereof occurs from the adhesion resulting from the accumulations of static electricity. The same difficulty is found to exist in connection with toilet-paper. The terminal edge of each succeeding sheet-section will cling so closely to the roll as to render it almost impossible to be found and seized. What I have done is to make provision for causing each sheet-section to automatically become separated from the remainder of the roll and assume a position which will permit the former's terminal edge to be easily grasped. While this has been attempted before, it has never been so perfectly accomplished as by means of my invention.

By having the kidney-shaped roll 1 supported by its core 2 in the position shown in Fig. 1 its terminal sheet-section 10 hangs with its free end below the roll and with its upper end passing up over the roll and down to the neck 6 by which such sheet is joined to the remainder of the paper. This terminal sheet is also bound to the roll by the strips 3, gummed to its edges and to the edges of the other sheet-sections and also to the core 2. The function of said strips is to hold the different layers of paper in place both in the direction of their length and from bellying outwardly instead of remaining in the concave shape desired, for without such fastening device the front layers of the roll would have nothing to prevent their curving outward instead of inward, and so rendering the arrangement inoperative. Inasmuch as a straight line is the shortest distance between two points, when the terminal sheet 10 is pulled down upon by grasping its free end the outermost layer of paper at the concave side of the roll will be withdrawn from the control of the strips 3 and will occupy a straight line between the outjutting ends of the roll, like a bow-string between the ends of a bow. This separation of the said outermost layer from the remainder of the roll at the said side of the latter moves the junction between the terminal sheet 10 and the next succeeding sheet far enough away from the remainder of the roll to remove all tendency of the leading end of the said succeeding sheet adhering to the rest of the roll. Then the pull upon the terminal sheet 10 being continued, its neck 6 is torn through and itself removed, leaving the leading end of the succeeding sheet standing in a vertical position. The said leading end being then wholly unsupported, immediately drops downward into the position of the terminal sheet 10. (Illustrated in Fig. 1.)

In addition to overcoming all danger from static electricity my arrangement further insures that there shall be no clinging fibers of paper or folded edges to interfere with the end of a terminal sheet from falling by gravity into the position shown.

The fixture best adapted for supporting the roll in the form and position shown in Fig. 1 forms the subject-matter of my patent issued December 30, 1902, No. 717,174.

In the construction illustrated by Fig. 3 the concavity or crescent shape of the roll is made so deep that the separation of each sheet-section from the remainder of the roll brings the freshly-torn end of the following sheet-section fully two inches away from its original position.

What I claim as my invention, and for which I desire Letters Patent, is as follows, to wit:

1. A roll of toilet-paper in partially-severed sections, all the lines of severance being at the same part of the roll, and the face of the roll at such part being substantially concave, substantially as described.

2. A roll of toilet-paper in partially-severed sections, all the lines of severance being at the same part of the roll, and the face of the roll at such part being substantially concave, in combination with means for removably securing together in such part all the sheet-sections at one side of the lines of severance, substantially as described.

3. A roll of toilet-paper in partially-severed sections, all the lines of severance being at the same part of the roll, in combination with means for removably holding together all the ends of the sheet-sections at the advanced side of the lines of severance, substantially as described.

4. A roll of toilet-paper in partially-severed sections, all the lines of severance being at the same part of the roll, in combination with a supporting-core within the roll, and means held by said core for removably holding together all the ends of the sheet-sections at the advanced side of the lines of severance, substantially as described.

5. A roll of toilet-paper in partially-severed sections, all the lines of severance being at the same part of the roll, and the roll at said part being substantially concave, in combination with a supporting-core within the roll, and means held by said core for removably securing in such concave position all the ends of the sheet-sections at one side of the lines of severance, substantially as described.

6. A roll of toilet-paper in partially-severed sections, all the lines of severance being at the same part of the roll, and the roll at such part being substantially concave, in combination with a square of pasteboard within said roll curved to correspond thereto, and strips or tapes gummed to said pasteboard and to the side edges of all the ends of the sheet-sections at one side of the lines of severance, substantially as described.

7. The combination of a roll of toilet-paper having a concave surface at one part, means for holding the said surface in its concave condition, and means for occasioning the severance of the outer layer of paper into sections when said layer is drawn taut across said concavity.

In testimony that I claim the foregoing invention I have hereunto set my hand this 6th day of June, 1903.

WILBUR M. DAVIS.

Witnesses:
A. B. UPHAM,
WENDELL W. CHASE.